United States Patent [19]

Challen et al.

[11] 4,303,681

[45] Dec. 1, 1981

[54] MEAT FILLED PIE CONTAINING CHEMICALLY SET GEL PARTICLES AND PROCESS

[75] Inventors: Ian A. Challen; Sandra East, both of Rushden; George R. Sanderson, Bedford, all of England

[73] Assignee: Internationale Octrooi Maatschappij "OCTROPA", Rotterdam, Netherlands

[21] Appl. No.: 77,732

[22] Filed: Sep. 20, 1979

[30] Foreign Application Priority Data

Sep. 20, 1978 [GB] United Kingdom ............... 37495/78

[51] Int. Cl.³ .................... A21D 13/08; A23L 1/04
[52] U.S. Cl. ...................................... 426/92; 426/283; 426/574; 426/575; 426/577

[58] Field of Search ................. 426/94, 302, 305, 573, 426/574, 577, 652, 646, 332, 496, 289, 291, 293, 92, 283

[56] References Cited

U.S. PATENT DOCUMENTS 3,615,690 10/1971 Schampel ............................ 426/283
3,973,051 8/1976 Buckley ............................... 426/577

*Primary Examiner*—Joseph M. Golian
*Assistant Examiner*—Elizabeth A. Hatcher
*Attorney, Agent, or Firm*—Barry Kramer

[57] ABSTRACT

Baked filled pies having a meat filling which are succulent and non-soggy and have a high bacteriological standard, are obtained by dispersing chemically set gel particles, like alkaline earth metal alginate or low-methoxy pectate, into the meat filling in a weight ratio of meat filling to gel particles of 50:50 to 95:5, respectively.

8 Claims, No Drawings

MEAT FILLED PIE CONTAINING CHEMICALLY SET GEL PARTICLES AND PROCESS

The present invention relates to filled pies comprising a pastry shell and meat filling, as well as to a filling mass for such pies.

It is known to manufacture filled pies by providing a pastry shell, introducing a meat filling into this shell, covering the filling with a lid or top crust of pastry and thereafter effecting heating to bake the pastry and cook the filling. Usually small holes are pricked in the covering dough sheet to permit the escape of steam during subsequent baking.

In general the meat fillings are made by mincing meat or a mixture of different kinds of meat, introducing this into the pastry shell, providing the top crust and baking the pie. After baking an edible gelling solution is introduced to cover the meat filling, which is allowed to set when the pie cools.

The disadvantages of this method reside in spillage of the gelling solution which is injected automatically or by hand, resulting in bacteriological contamination, which may also easily occur during the introduction of the gelling agent, such as gelatin, especially when the ambient temperature is relatively high as in summer. A possible remedy to this situation would be to omit the gelling solution, but this would give a pie of decreased quality since it is less succulent and tends to dry out during transport and storage.

When injected, the gelling solution forms a more or less coherent layer on top of the central meat fill and around the sides such that it is in intimate contact with both meat fill and the pastry shell. This contact with the pastry shell allows moisture to penetrate the pastry causing the latter to go soggy.

It has now been found that these disadvantages can be reduced by making a filling in which chemically set gel particles are dispersed in a meat matrix. In this way filled pies are provided, during the manufacture of which the above mentioned bacteriological problems are almost entirely eliminated and which, owing to the character of the modified meat filling, have a good succulence and exhibit minimal sogginess or drying out during storage. The gel particles are heat stable and can therefore be added to the meat filling mass prior to baking, thereby avoiding the bacteriological problems after baking.

In accordance with the present invention a method is provided of manufacturing a baked filled pie containing a meat filling in which a pastry shell is provided with a meat filling and baked, which comprises providing a pastry shell and introducing a filling comprising a mixture of comminuted, raw or partially cooked meat and chemically set gel particles, covering the filling with pastry and thereafter effecting heating to bake the pastry. The heating step may be carried out immediately after the formation of the filled pie, but may also be effected after a cool storage and/or transport.

The invention also relates to the baked filled pies thus obtained.

By chemically set gel particles are understood gel particles which are made by converting gel-forming materials into a heat-irreversible i.e. non-melting gel structure by contact with a setting or gelation solution or dispersion. Examples of these chemically set gel particles are calcium alginates, low-methoxy pectates and the like. The setting solution releases the alkaline earth metal ions, such as magnesium and preferably calcium ions, which are contained in the alginate, low-methoxy pectate or the like containing mixture. Techniques of preparing such chemically set gels have e.g. been described in British Patent Specification No. 1,369,198 and European Patent Application Publication No. 9897 published Apr. 16, 1980 which are incorporated by way of reference in this specification.

Once the chemically set, heat-irreversible gel structure has been formed, the gel is comminuted to the required particle size, using a suitable comminuting device. The particles may of course also be formed by shaping the gel during its formation or forming the gel structure in moulds.

It will be clear that before the conversion into a heat-irreversible gel structure, the gel-forming material or the setting or gelation solution may be mixed with further edible constituents, such as fruit puree, fruit pulps or particles, colouring agents, flavouring agents, spices, essences, texture modifiers and the like, provided that these do not interfere with the gel-forming reaction.

The comminuted raw or partially cooked meat may be beef, pork meat, chicken meat, steak and kidney, fish or mixtures of various types of natural meat and/or vegetable protein fibres. Also other edible constituents, like one or more vegetables, flavouring agents, colouring agents and the like may be added.

The weight ratio between the comminuted meat and the chemically set gel particles in the pie filling mass varies from 50:50 to 95:5, respectively. The pastry used to prepare the filled pies according to the present invention is the pastry which is conventionally being used for the preparation of meat pies, steak and kidney or fruit pies. Heating of the pie to effect baking is carried out at temperatures from 190° to 210° C. for a period of from 45 to 70 minutes, the higher temperatures corresponding to shorter times.

The invention also relates to a method of manufacturing a filling mass for pies which comprises mixing comminuted, raw or partially cooked meat and the chemically set gel particles in a weight ratio of from 50:50 to 95:5, respectively, as well as the filling mass thus obtained.

The invention is now illustrated by the following non-restrictive Examples.

EXAMPLE I

The following mixture was mixed and subsequently comminuted to an average particle size of 5 mm in a conventional meat grinding device:
  67.4 wt. % of port meat comprising 19% fat
  0.5 wt. % of flavouring agents
  7.7 wt. % of farina
  24.4. wt. % of brine (2.37 wt. % of brining salt).
This comminuted mixture was used as the meat component in the pie filling.

A heat-irreversible gel was prepared from:
  2.30 wt. % of sodium alginate (manugel SLB, trade mark; ex Alginate Industries Ltd.)
  67.30 wt. % of deionised water
  0.40 wt. % dicalcium phosphate
as the gel-forming material and:
  0.15 wt. % citric acid
  0.30 wt. % of meat flavouring agents
  1.00 wt. % of sodium chloride
  28.55 wt. % of deionised water
as the setting or gelation solution by mixing these two solutions in an Oakes (trademark) mixer and collecting the solution in containers in which the heat-irreversible gel structure was formed.

The gel which had taken the form of the container in which it was formed, was not comminuted into pieces having an average size of 5 mm.

The chemically set gel particles were subsequently mixed into the meat component in a weight ratio of meat component to gel particles of 80:20.

The pie filling mass thus obtained was introduced in a conventional pastry pie shell in such an amount that the weight of the filling was 35% of the total weight of the pie.

After having placed a sheet of dough on top of the meat filling and having affixed this sheet to the top of the side walls of the shell, the complete pie was heated in an oven at a temperature of 200° C. for 45 minutes.

EXAMPLE II

Example I was repeated but now using together with the meat component, gel particles of heat-irreversible gel, prepared from:

1.25 wt. % of sodium alginate (Manugel DMM, trademark ex Alginate Industries Limited)
5.00 wt. % of sugar
0.30 wt. % of dicalcium phosphate
43.45 wt. % of water as the gel-forming material, and 38.00 wt. % of apple puree
3.00 wt. % of sugar
1.00 wt. % of citric acid
1.00 wt. % of sodium citrate
3.50 wt. % of apple flavouring material
3.50 wt. % of water as the setting or gelation solution.

As in Example I the baked filled pie obtained in using this filling mass was more succulent and less dry and soggy than a similar control baked filled pie, using a filling mass without the gel particles.

We claim:

1. A method of manufacturing a baked filled pie containing a meat filling in which a pastry shell is provided with a meat filling and baked, which comprises providing a pastry shell and introducing a filling comprising a mixture of comminuted, raw or partially cooked meat and chemically set gel particles, covering the filling with pastry and thereafter effecting heating to bake the pastry.

2. A method according to claim 1, in which the chemically set gel particles comprise alkaline earth metal alginate.

3. A method according to claim 1, in which the chemically set gel particles comprise alkaline earth metal low-methoxy pectate.

4. A method according to claims 1, 2 or 3, in which the weight ratio between the comminuted meat and the chemically set gel particles is from 50:50 to 95:5, respectively.

5. A method according to claims 1, 2 or 3, in which the chemically set gel particles are mixed with fruit puree, fruit pulp or fruit particles.

6. A baked, filled pie prepared by a method as claimed in claims 1, 2 or 3.

7. A baked, filled pie prepared by a method as claimed in claim 4.

8. A baked, filled pie prepared by a method as claimed in claim 5.

* * * * *